United States Patent
Hong et al.

(10) Patent No.: US 8,156,754 B2
(45) Date of Patent: Apr. 17, 2012

(54) CARBON DIOXIDE REFRIGERANT-COOLANT HEAT EXCHANGER

(75) Inventors: Kwangtaek Hong, Ann Arbor, MI (US); Bryan Styles, Livonia, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 573 days.

(21) Appl. No.: 12/403,937

(22) Filed: Mar. 13, 2009

(65) Prior Publication Data

US 2010/0229577 A1 Sep. 16, 2010

(51) Int. Cl.
  *F25B 27/00* (2006.01)
(52) U.S. Cl. .......................... 62/323.1; 62/434
(58) Field of Classification Search .................. 62/323.1, 62/244, 335, 434, 190, 197, 243, 513; 165/42, 165/202
See application file for complete search history.

(56) References Cited

U.S. PATENT DOCUMENTS

| | | | |
|---|---|---|---|
| 2,120,764 A * | 6/1938 | Newton | 62/83 |
| 5,251,603 A * | 10/1993 | Watanabe et al. | 123/541 |
| 6,044,655 A | 4/2000 | Ozaki et al. | |
| 6,105,386 A | 8/2000 | Kuroda et al. | |
| 6,138,468 A * | 10/2000 | Yokomachi et al. | 62/228.5 |
| 6,276,161 B1 * | 8/2001 | Peiffer et al. | 62/406 |
| 6,457,324 B2 * | 10/2002 | Zeigler et al. | 62/406 |
| 6,574,977 B2 | 6/2003 | Ozaki et al. | |
| 6,755,046 B2 | 6/2004 | Nishida et al. | |
| 6,789,613 B1 | 9/2004 | Ozaki et al. | |
| 6,915,649 B2 * | 7/2005 | Amaral et al. | 62/244 |
| 6,920,922 B2 | 7/2005 | Takeuchi | |
| 7,059,151 B2 * | 6/2006 | Taras et al. | 62/513 |
| 2005/0039878 A1 * | 2/2005 | Meyer et al. | 165/42 |

* cited by examiner

*Primary Examiner* — Mohammad Ali
(74) *Attorney, Agent, or Firm* — Harness, Dickey & Pierce, PLC

(57) ABSTRACT

A climate control system may include a condenser, an evaporator, a compressor, a coolant circuit, and a heat exchanger. The evaporator may be in fluid communication with the condenser. The compressor may be in fluid communication with the condenser and the evaporator and may circulate a first fluid therebetween. The coolant circuit may include an engine, a radiator, and a second fluid circulating between the engine and the radiator. The heat exchanger may include a first fluid conduit and a second fluid conduit. The first fluid conduit may fluidly couple the compressor and the condenser. The second fluid conduit may fluidly couple the radiator and the engine. The heat exchanger may be configured to allow the second fluid to absorb heat from the first fluid.

15 Claims, 2 Drawing Sheets

CARBON DIOXIDE REFRIGERANT-COOLANT HEAT EXCHANGER

FIELD

The present disclosure relates to a climate control system and more particularly, to a climate control system having a refrigerant-coolant heat exchanger.

BACKGROUND

This section provides background information related to the present disclosure which is not necessarily prior art. Many modern vehicles, such as automobiles, include climate control systems or air conditioning systems that operate to cool a passenger compartment of a vehicle. These cooling systems typically include a condenser or gas cooler, an evaporator, and a compressor circulating or pumping a refrigerant between the condenser and evaporator. Under certain operating conditions, the condenser may be inadequate to sufficiently cool the refrigerant, which may reduce the efficiency and longevity of the cooling system. Cooling system efficiency, manufacturing complexity, vehicle packaging constraints, and environmental concerns may be among the many persistent challenges and obstacles for modern automotive cooling systems and climate control systems.

SUMMARY

This section provides a general summary of the disclosure, and is not a comprehensive disclosure of its full scope or all of its features. In one form, the present disclosure provides a climate control system may include a first fluid circuit and a second fluid circuit. The first fluid circuit may include a first heat exchanger, a second heat exchanger and a compressor, which may be in fluid communication with the first heat exchanger and the second heat exchanger and may circulate a first fluid therebetween. The second fluid circuit may include an engine, a third heat exchanger, and a second fluid circulating between the engine and the third heat exchanger. The climate control system may also include a fourth heat exchanger having a first fluid conduit and a second fluid conduit. The first fluid conduit may fluidly couple the compressor and the first heat exchanger. The second fluid conduit may fluidly couple the third heat exchanger and the engine. The second fluid conduit may absorb heat from the first fluid in the fourth heat exchanger.

In another form, the present disclosure provides a climate control system that may include a condenser, an evaporator, a compressor, a coolant circuit, and a heat exchanger. The evaporator may be in fluid communication with the condenser. The compressor may be in fluid communication with the condenser and the evaporator and may circulate a first fluid therebetween. The coolant circuit may include an engine, a radiator, and a second fluid circulating between the engine and the radiator. The heat exchanger may include a first fluid conduit and a second fluid conduit. The first fluid conduit may fluidly couple the compressor and the condenser. The second fluid conduit may fluidly couple the radiator and the engine. The heat exchanger may be configured to allow the second fluid to absorb heat from the first fluid.

In yet another form, the present disclosure provides a cooling system for a vehicle that may include a condenser, an evaporator, a compressor, an engine coolant circuit and a heat exchanger. The evaporator may be in fluid communication with the condenser. The compressor may be in fluid communication with the condenser and the evaporator and may circulate a carbon dioxide refrigerant therebetween. The engine coolant circuit may include an engine coolant circulating between an internal combustion engine and a radiator. The internal combustion engine may drive the compressor and the vehicle. The heat exchanger may include a first fluid conduit and a second fluid conduit. The carbon dioxide refrigerant may flow through the first fluid conduit, and the engine coolant may flow through the second fluid conduit. The engine coolant may absorb heat from the carbon dioxide refrigerant and heat from the internal combustion engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
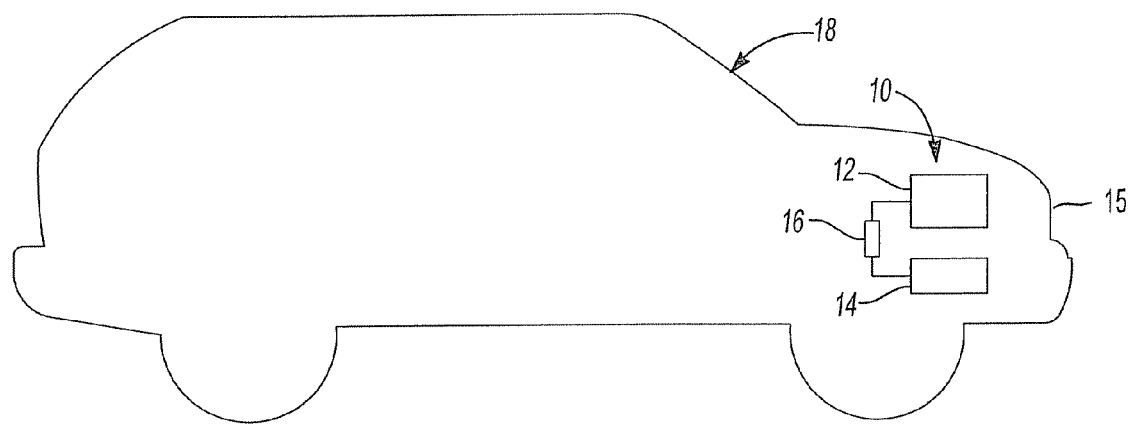
FIG. 1 is a schematic representation of a vehicle having a climate control system according to the principles of the present disclosure.

Example embodiments will now be described more fully with reference to FIGS. 1-4. A climate control system 10 is provided and may include a first fluid circuit 12, a second fluid circuit 14, and a refrigerant-coolant heat exchanger 16 which may be in fluid communication with the first and second fluid circuits 12, 14. The climate control system 10 may be installed in a vehicle 18 and the first and second fluid circuits 12, 14 may cooperate to control a temperature within a passenger compartment or cabin of the vehicle 18.

The first fluid circuit 12 may include a compressor 20, a gas cooler or condenser 22, an expansion device 24, an evaporator 26, and an accumulator 28. The compressor 20 may circulate or pump a first fluid, such as carbon dioxide, R-1234yf, or R-134a, for example, through the first fluid circuit 12 in a counterclockwise direction relative to the view shown in FIG. 2. It will be appreciated that the first fluid could be any refrigerant or coolant suitable to cool an automobile cabin or passenger compartment.

The compressor 20 may be operable to draw relatively low pressure fluid, compress the fluid to a relatively higher pressure and discharge the fluid at the relatively high pressure. The compressor 20 can be a reciprocating compressor, a scroll compressor, or a rotary vane compressor, for example, or any other suitable type and be driven by the engine 46, which in turn may power the vehicle 18. The condenser 22 may include a heat exchanger or coil having an inlet 30 adapted to receive the high pressure fluid from the compressor 20. The fluid may reject heat to the ambient air as the fluid flows through the coil and ambient air passes the coil exterior. A fan 32 may force the ambient air across the coil of the condenser 22 and/or air flowing through a grill 15 of the vehicle 18 may flow across the coil of the condenser 22 to facilitate heat transfer between the ambient air and the fluid flowing internally through the condenser 22. The fluid may then exit the condenser 22 through an outlet 34. It will be appreciated that the condenser 22 could be a gas cooler, a radiator, or any other suitable heat exchanger.

The expansion device 24 may be an orifice tube or an expansion valve, for example. The expansion device 24 may be fluidly coupled with the condenser 22 and the evaporator 26. Fluid flowing through the expansion device 24 may expand, thereby lowering the pressure and temperature of the fluid. A sensor 36 may be in communication with or integrated into the expansion device 24 and may sense a temperature and/or pressure of the fluid downstream of the condenser 22. The amount of fluid allowed to pass through the expansion device 24 may be controlled based on the temperature and/or pressure sensed by the sensor 36.

The evaporator 26 may include a heat exchanger or tubular coil having an inlet 38 adapted to receive the first fluid from the expansion device 24. The fluid may absorb heat from the ambient air as it flows through the tubular coil. A fan 40 may force the ambient air across or around the outside of the tubular coil of the evaporator 26 to facilitate heat transfer therebetween. Air forced across or through the evaporator 26 may be subsequently channeled through one or more ducts to the cabin or passenger compartment of the vehicle 18, for example. The fluid may then exit the evaporator 26 through an outlet 42 as a low pressure mixture of liquid and vapor. The outlet 42 of the evaporator 26 may be fluidly coupled to the accumulator 28, which may receive the mixture of liquid and vapor. The accumulator 28 may separate the liquid from vapor, store the liquid in a reservoir and allow the vapor to be drawn into the compressor 20.

Figure 2:
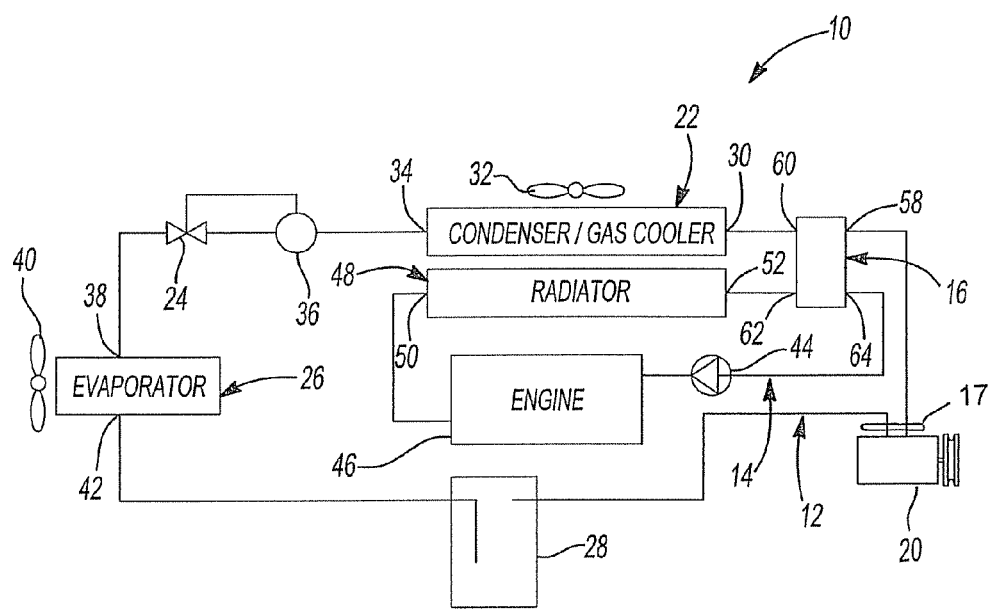
FIG. 2 is a schematic representation of the climate control system according to the principles of the present disclosure.
Figure 3:
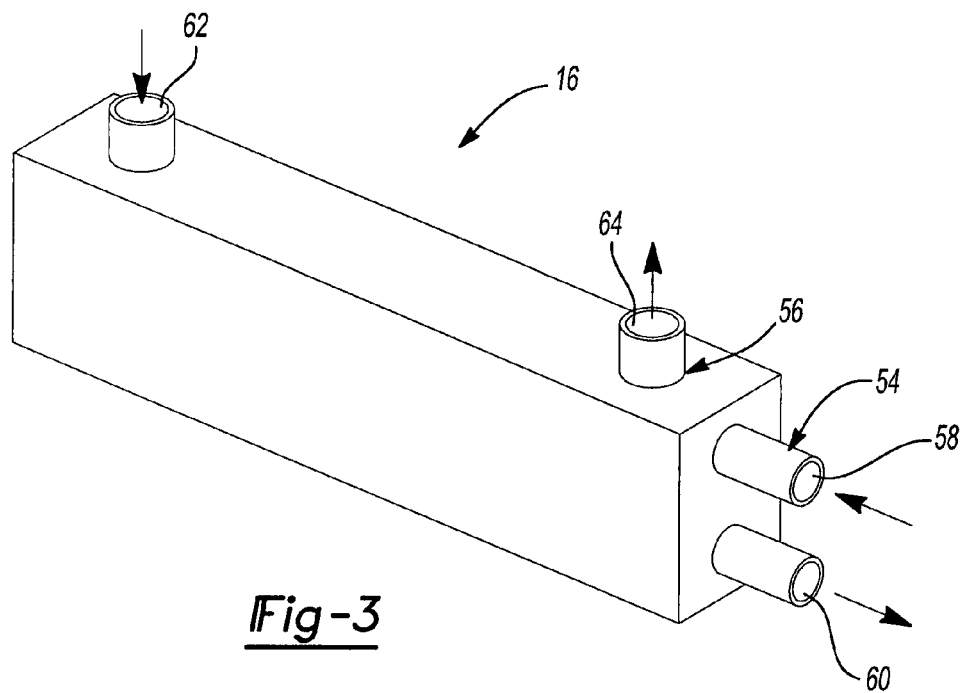
FIG. 3 is a perspective view of a heat exchanger of the climate control system according to the principles of the present disclosure.

The second fluid circuit 14 may include a pump 44, an engine 46, and a radiator 48. The pump 44 may circulate a second fluid such as a liquid engine coolant, for example, through the second fluid circuit 14 in a clockwise direction relative to the view depicted in FIG. 2. Although FIG. 2 depicts the pump 44 being upstream of the engine 46 and downstream of the radiator 48, it will be appreciated that the pump 44 could be located at any position along the second fluid circuit 14.

The engine 46 may be an internal combustion engine and may provide rotary power to the wheels of the vehicle 18. The pump 44 and/or the compressor 20 may be powered by the engine 46 via one or more belts, gears or any other means of rotary power transmission. It should be appreciated, however, that the pump 44 and/or the compressor 20 could be powered by an electric motor or any other power source. The second fluid may be pumped through passages within the engine 46 to absorb heat and maintain the engine 46 within an optimal operational temperature range.

The radiator 48 may include a heat exchanger or tubular coil having an inlet 50 adapted to receive high-temperature fluid from the engine 46. The fluid may reject or transfer heat to the ambient air as the fluid flows through the tubular coils of the radiator 48. The fan 32 may force ambient air across or around the tubular coils of the radiator 48 to facilitate heat transfer between the air and the fluid flowing through the radiator 48. Air not forced by the fan 32, such as air passing through a grill 15 of the vehicle 18 may flow across the radiator 48 The fluid may then exit the radiator 48 through an outlet 52 and recirculate through the second fluid circuit 14.

The refrigerant-coolant heat exchanger 16 may include a first coil or pipe 54 and a second coil or pipe 56. The first pipe 54 may include an inlet 58 and an outlet 60. The first fluid may flow from the compressor 20, into the inlet 58, through the first pipe 54, and exit through the outlet 60. The outlet 60 may be fluidly coupled with the inlet 30 of the condenser 22. The second pipe 56 may include an inlet 62 and an outlet 64. The second fluid may flow from the radiator 48, into the inlet 62, through the second pipe 56, and exit through the outlet 64. The outlet 64 may be fluidly coupled with the pump 44 and/or engine 46. The first and second pipes 54, 56 may be formed from a polymeric material, a composite material, or a metallic material, such as aluminum, steel or copper, for example.

Figure 4:
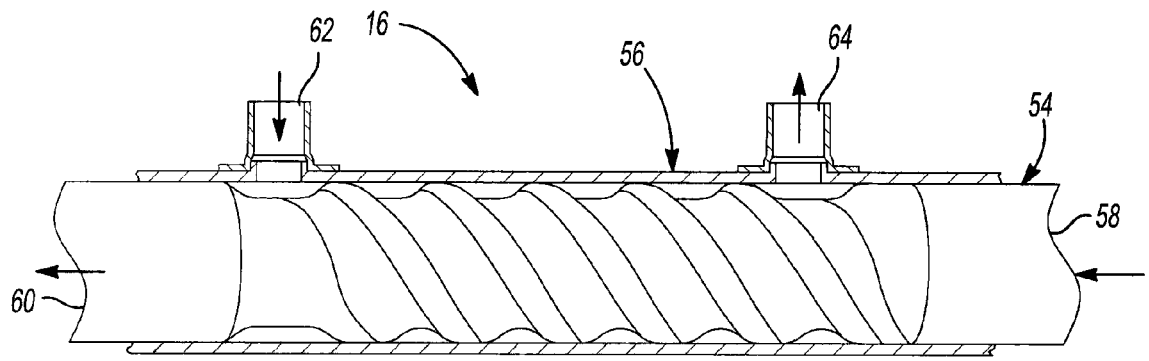
FIG. 4 is a cross sectional view of another embodiment of a heat exchanger according to the principles of the present disclosure.

The first and second pipes 54, 56 may be arranged relative to each other such that the second fluid flowing through the second pipe 56 may absorb heat from the first fluid flowing through the first pipe 54. As depicted in FIG. 4, the first and second pipes 54, 56 may be coaxial. An inner diameter of the outer or second pipe 56 may surround an outer diameter of the inner or first pipe 54. The first pipe 54 may have a generally circular cross-section and at least a portion of the outer diameter may be spiraled or grooved to form a spiral shape from one end of the pipe to the other end of the pipe. The first pipe may define a spiral or helical flow path through the second pipe 56 between the outer diameter of the first pipe 54 and the inner diameter of the second pipe 56. The inner diameter of the second pipe 56 may be smooth bored and contact the outer diameter of the first pipe 54 at only peaks of the inner pipe 54. The spiral flow path around the outer diameter of the first pipe 54 may increase heat transfer between the first fluid flowing through the inside of the first pipe 54 and the second fluid flowing through the second pipe 56 and around the outer diameter of the first pipe 54 because the surface area of the outer diameter of the inner pipe 54 is increased as opposed to an inner pipe with a straight and smooth outside diameter. The first pipe 54 may also include a spiraled inner diameter, machined or formed like the outer diameter, to define a spiral flow path through the inside of the first pipe 54. It will be appreciated that the refrigerant-coolant heat exchanger 16 may be otherwise arranged. For example, the refrigerant-coolant heat exchanger 16 could include the configuration of the heat exchanger disclosed in U.S. Pat. No. 6,789,613, the disclosure of which is hereby incorporated by reference as if fully set forth herein.

As described above, the refrigerant-coolant heat exchanger 16 may remove heat from the first fluid before the first fluid enters the condenser 22, where additional heat will be subsequently removed. More specifically, the second fluid of the second fluid circuit 14 may remove heat from the first fluid of the first fluid circuit 12 before the first fluid enters the condenser 22. Accordingly, the refrigerant-coolant heat exchanger 16 may cooperate with the condenser 22 to cool the first fluid before it reaches the expansion device 24. In this manner, the refrigerant-coolant heat exchanger 16 may improve the efficiency, such as the thermal efficiency, and performance of the climate control system 10. Such increased efficiency and performance may be especially beneficial while the engine 46 of the vehicle 18 is operating at an idle condition and other conditions in which the compressed discharge temperature of the compressor 20 is relatively high, or at least higher than the second fluid.

In yet another assembly, the teachings may provide a climate control system 10 that employs a condenser 22, an evaporator 26 in fluid communication with the condenser 22, a compressor 20 in fluid communication with the condenser 22 and the evaporator 26 and circulating a carbon dioxide refrigerant, all of which may be considered part of the first fluid circuit 12, which may be a refrigeration circuit. The condenser exchanges heat between refrigerant passing internally through the condenser and a first air flow passing externally over the condenser while the evaporator exchanges heat between refrigerant passing internally through the evaporator and a second air flow introduced or blown inside or into the vehicle. It may be further appreciated, to improve efficiency of the first fluid circuit 12, a heat exchanger 17 may be fluidly couple the condenser 22 and the evaporator 26, to remove heat from the first fluid before the first fluid enters the evaporator 26.

Furthermore, the system 10 may employ a second fluid circuit 14, also known as a cooling circuit, including an engine 46 and a radiator 48 that circulates an engine coolant. Additionally, a refrigerant-coolant heat exchanger 16 may include a first fluid conduit 54 for passing the carbon dioxide refrigerant and a second fluid conduit 56 for passing the engine coolant, the first fluid conduit 54 fluidly coupling the compressor 20 and the condenser 22, the second fluid conduit 56 fluidly coupling the radiator 48 and the engine 46, such that the refrigerant-coolant heat exchanger 16 is adapted to allow the engine coolant to absorb heat from the carbon dioxide refrigerant, and a portion of the first fluid conduit 54 may be coaxial with a portion of the second fluid conduit 56, as depicted in FIG. 4.

The climate control system may further employ an expansion device 24, which may be in fluid communication with the condenser 22 and the evaporator 26, that is controlled based on a temperature of the carbon dioxide refrigerant exiting the condenser 22. Air that passes through a grill 15 of the vehicle may surround and flow through and around the condenser 22 and the radiator 48 to absorb heat from the first fluid and the second fluid. The first fluid conduit 54 may further employ an outside diameter with a spiral fluid path defined by a peak that winds around the outside diameter and a valley that also winds around the outside diameter. The second fluid conduit 56 may an inside diameter that contacts the peaks of the outside diameter of the first conduit 54. The second conduit 56 may further have an inlet 62 and an outlet 64 to provide flow paths into the valley of the first conduit 54.

The climate control system 10 may employ a refrigerant-coolant heat exchanger 16 having a carbon dioxide refrigerant conduit 54 and an engine coolant conduit 56. The carbon dioxide refrigerant conduit 54 may fluidly couple the compressor 20 and the heat-exchanging condenser 22. The engine coolant conduit 56 may fluidly couple the heat-exchanging radiator 48 and the engine 46. The carbon dioxide refrigerant conduit 54 may be tubular and reside inside of the engine coolant conduit 56. Moreover, the carbon dioxide refrigerant conduit 54 may having a spiral groove formed, machined, or molded into its outside diameter with a spiral peak contacting an inside diameter of the engine coolant conduit 56. An engine coolant conduit inlet 62 and an engine coolant conduit outlet 64 may be located at opposite ends of the spiral groove on the outside diameter of the carbon dioxide refrigerant conduit 54. The carbon dioxide refrigerant conduit 54 and the engine coolant conduit 56 may be entirely coaxial or partially coaxial. The refrigerant-coolant heat exchanger 16 may be employed such that the engine coolant absorbs heat from the carbon dioxide refrigerant in the refrigerant-coolant heat exchanger 16.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A climate control system for a vehicle comprising:
   a refrigeration circuit including:
   a condenser that exchanges heat between refrigerant passing internally through the condenser and a first air flow passing externally over the condenser;
   an evaporator that exchanges heat between refrigerant passing internally through the evaporator and a second air flow introduced inside of the vehicle; and
   a compressor, the compressor in fluid communication with the condenser and the evaporator and circulating a refrigerant therebetween;
   a cooling circuit including:
   an engine;
   a radiator, and a coolant circulating between the engine and the radiator; and
   a refrigerant-coolant heat exchanger having a first fluid conduit and a second fluid conduit, the first fluid conduit in fluid communication with the compressor and in direct fluid communication with the condenser, the second fluid conduit in direct communication with the radiator and in communication with the engine,
   wherein the coolant absorbs heat from the refrigerant in the refrigerant-coolant heat exchanger.

2. The climate control system of claim 1, wherein:
   the refrigerant includes a carbon dioxide refrigerant, and
   the coolant includes an engine coolant.

3. The climate control system of claim 1, wherein a portion of the first fluid conduit is coaxial with a portion of the second fluid conduit.

4. The climate control system of claim 1, further comprising:
   an expansion device in fluid communication with the condenser and the evaporator, wherein the expansion device is controlled based on a temperature of the refrigerant exiting the condenser.

5. The climate control system of claim 1, further comprising:
   a refrigerant heat exchanger fluidly coupling the condenser and the evaporator, wherein the refrigerant heat exchanger is adapted to remove heat from the refrigerant before the refrigerant enters the evaporator.

6. The climate control system of claim 1, wherein the first and second fluid circuits are disposed in the vehicle.

7. The climate control system of claim 1, wherein air flows through a grill of the vehicle and across the condenser and the radiator to absorb heat from the refrigerant and the coolant.

8. A climate control system comprising:
   a condenser;

an evaporator in fluid communication with the condenser;
a compressor in fluid communication with the condenser and the evaporator and circulating a refrigerant;
a coolant circuit including an engine, a radiator, and engine coolant circulating between the engine and the radiator; and
a refrigerant-coolant heat exchanger including a first fluid conduit for passing the refrigerant and a second fluid conduit for passing the engine coolant, the first fluid conduit fluidly in communication with the compressor and in direct communication with the condenser, the second fluid conduit fluidly in direct communication with the radiator and in communication with the engine, wherein:
the refrigerant-coolant heat exchanger is adapted to allow the engine coolant to absorb heat from the refrigerant, and
a portion of the first fluid conduit is coaxial with a portion of the second fluid conduit,
an outside diameter of the first fluid conduit has a spiral fluid path defined by a peak that winds around the outside diameter and a valley that also winds around the outside diameter,
the second fluid conduit has an inside diameter that contacts the peak of the outside diameter of the first conduit.

9. The climate control system of claim 8, further comprising:
an expansion device in fluid communication with the condenser and the evaporator, wherein the expansion device is controlled based on a temperature of the refrigerant exiting the condenser.

10. The climate control system of claim 9, wherein:
the engine powers the compressor, and
the engine powers a vehicle.

11. The climate control system of claim 10, wherein air through a grill of the vehicle surrounds the condenser and the radiator to absorb heat from the first fluid and the second fluid.

12. The climate control system of claim 8, the second conduit further comprising:
an inlet and an outlet providing flow paths into the valley of the first conduit.

13. A climate control system comprising:
a first fluid circuit including a heat-exchanging condenser, a heat-exchanging evaporator and a compressor, the compressor in fluid communication with the heat-exchanging condenser and the heat-exchanging evaporator and circulating a carbon dioxide refrigerant therebetween;
a second fluid circuit including an engine, a heat-exchanging radiator, and an engine coolant circulating between the engine and the heat-exchanging radiator;
a temperature-controlled expansion device in fluid communication with the first and second heat exchangers; and
a refrigerant-coolant heat exchanger having a carbon dioxide refrigerant conduit and an engine coolant conduit, the carbon dioxide refrigerant conduit in fluid communication with the compressor and in direct fluid communication with the heat-exchanging condenser, the engine coolant conduit in direct fluid communication with the heat-exchanging radiator and in communication with the engine,
the carbon dioxide refrigerant conduit is tubular and resides inside of the engine coolant conduit, the carbon dioxide refrigerant conduit having a spiral groove formed in an outside diameter of the carbon dioxide refrigerant with a peak contacting an inside diameter of the engine coolant conduit.

14. The climate control system of claim 13, further comprising:
an engine coolant conduit inlet; and
an engine coolant conduit outlet, wherein the inlet and the outlet are located at opposite ends of the spiral on the outside diameter of the carbon dioxide refrigerant conduit.

15. The climate control system of claim 14, wherein:
the carbon dioxide refrigerant conduit and the engine coolant conduit are coaxial, and
the engine coolant absorbs heat from the carbon dioxide refrigerant in the refrigerant-coolant heat exchanger.

* * * * *